US006782607B2

(12) United States Patent
Pfautz et al.

(10) Patent No.: US 6,782,607 B2
(45) Date of Patent: Aug. 31, 2004

(54) WIRE POSITIONING DEVICE APPARATUS, METHODS AND ARTICLES OF MANUFACTURE

(75) Inventors: Douglas S. Pfautz, Landisville, PA (US); Christopher J. Karrasch, Boiling Springs, PA (US); David J. Erb, Harrisburg, PA (US)

(73) Assignee: Tyco Electronics Corporation, Middletown, PA (US)

(*) Notice: Subject to any disclaimer, the term of this patent is extended or adjusted under 35 U.S.C. 154(b) by 166 days.

(21) Appl. No.: 10/126,788

(22) Filed: Apr. 19, 2002

(65) Prior Publication Data

US 2003/0196322 A1 Oct. 23, 2003

(51) Int. Cl.[7] .................................................. B23P 19/00

(52) U.S. Cl. .............................. 29/745; 29/747; 29/748

(58) Field of Search .............................. 299/33 F, 745, 299/747, 748, 825, 592.1

(56) References Cited

FOREIGN PATENT DOCUMENTS

JP 56-069574 * 6/1981

* cited by examiner

*Primary Examiner*—Carl J. Arbes

(57) ABSTRACT

The present invention comprises apparatus, methods and articles of manufacture for processing and/or stripping wire comprising a wire processing or wire termination machine with a processing or stripping sub assembly actuated by a start sensor plate, where the start sensor plate has a textured surface, so as to retain the wires being stripped.

11 Claims, 4 Drawing Sheets

WIRE POSITIONING DEVICE APPARATUS, METHODS AND ARTICLES OF MANUFACTURE

FIELD OF THE INVENTION

The present invention generally relates to articles of manufacture, apparatus and methods for termination machines. More particularly, this invention relates to articles of manufacture, apparatus and methods for wire termination machines that install electrical connectors.

BACKGROUND OF THE INVENTION

Wire termination machines typically install terminals and/or contacts on wires by first sensing the end of a wire, then stripping the wire, and then crimping or otherwise fastening the terminal and/or contact to the stripped wire. Each of the steps may require somewhat complicated machinery to accomplish. Therefore, a typical wire termination machine is somewhat sophisticated.

Sensing the end of a wire may be done through a number of methods. One common method is to have the end of a wire deflect a start sensor plate on a start sensor assembly. This method may be problematic with wires, especially small gauge wires. For example, a small gauge wire may not be able to apply sufficient force or weight to properly deflect a start sensor plate due to sliding off the surface of the start sensor plate, and so a terminal and/or contact may not be installed at all, may be installed improperly, etc.

Accordingly, it would be beneficial if apparatus and/or methods were provided that would decrease the problems associated with small gauge wires on start sensor plates. It would further be beneficial if such apparatus and/or methods could be implemented through minor modifications of existing wire termination machinery.

Therefore, it is an object of the present invention to provide apparatus, methods and/or articles of manufacture to assist wires in deflecting a start sensor plate in a wire termination machine.

It is a further object of the present invention to provide apparatus, methods and/or articles of manufacture to assist wires in deflecting a start sensor plate in a wire termination machine implemented through minor modifications of existing wire termination machinery.

SUMMARY OF THE INVENTION

The summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

The present invention provides apparatus, methods and/or articles of manufacture that aid in a start sensor plate's detection and retention of a wire's end. In the preferred embodiments, at least part of the surface of the plate is textured or patterned, which assists in guarding against sliding of the wire once it contacts the plate. Also, various embodiments allow for replacement or retrofitting of non-textured start sensor plates in processing machines with a textured plate.

Texturing may be accomplished through a number of methods. The preferred embodiments use a laser marking system, as lasers provide for texturing the surface of the plate with minimal added deformation of the shape of that plate. Other embodiments may use abrasion, rollers or other methods.

Additionally, embodiments may comprise the application of a texture to an already existing plate, for example, the application of tape or other substance to a non-textured plate.

Additional objects, advantages and novel features of the invention will be set forth in part in the description and figures which follow, and in part will become apparent to those skilled in the art on examination of the following, or may be learned by practice of the invention.

DETAILED DESCRIPTION OF THE PREFERRED EMBODIMENTS

Reference is now made to the accompanying Figures for the purpose of describing, in detail, the preferred embodiments of the present invention. The Figures and accompanying detailed description are provided as examples and are not intended to limit the scope of the claims appended hereto.

Figure 1:
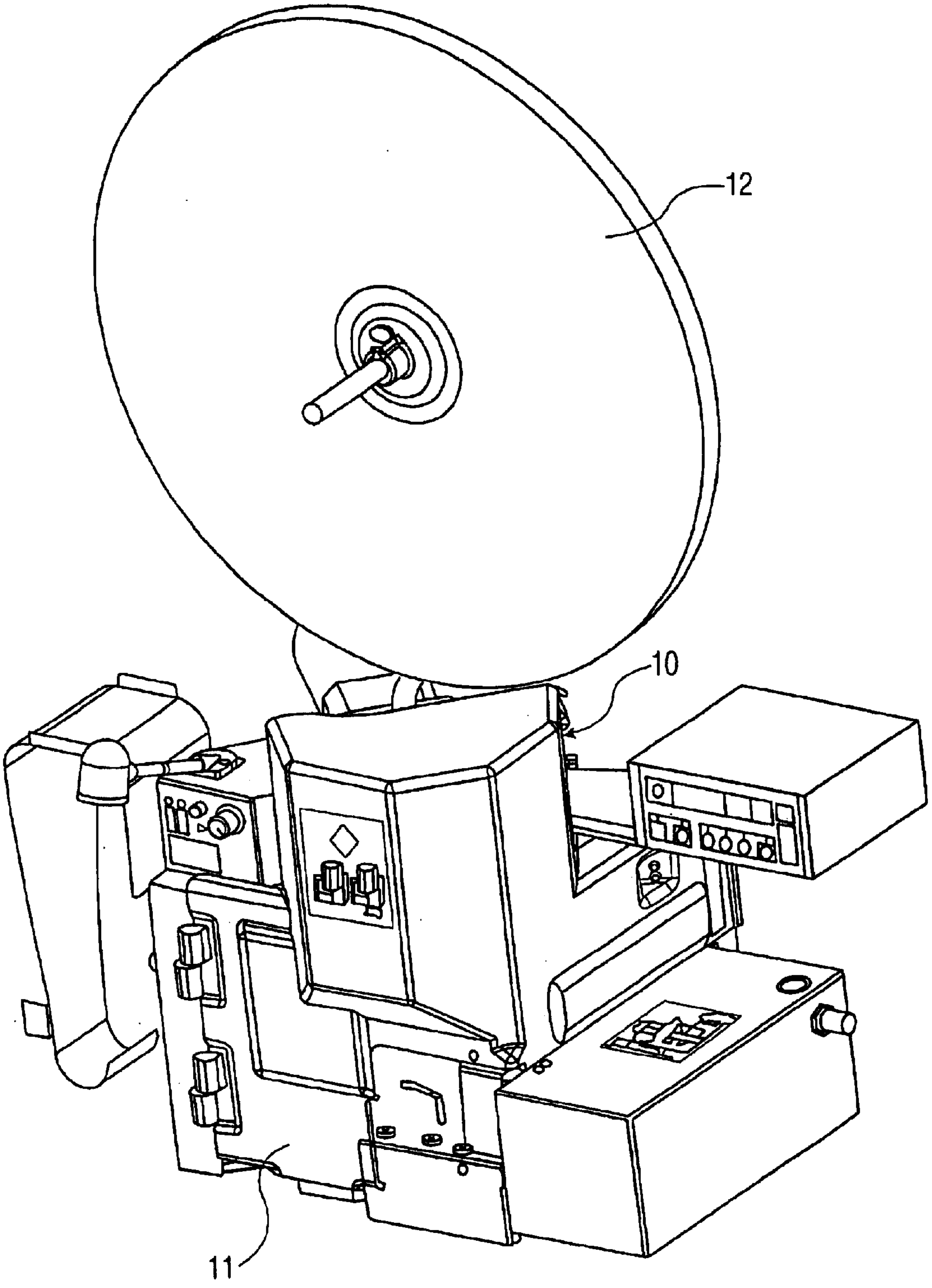
FIG. 1 shows an example of the prior art.

A wire termination machine as known in the prior art is shown generally at 10 in FIG. 1. The machine is comprised of various components that provide the ability to strip wire as well as crimp terminals on wire. An operator feeds precut lengths of wire into the machine through an opening in guard 11. The machine will then strip the wire and/or crimp terminals (fed from reel 12) on the wire lengths. The completed wire lengths are then removed from the machine.

Figure 2:
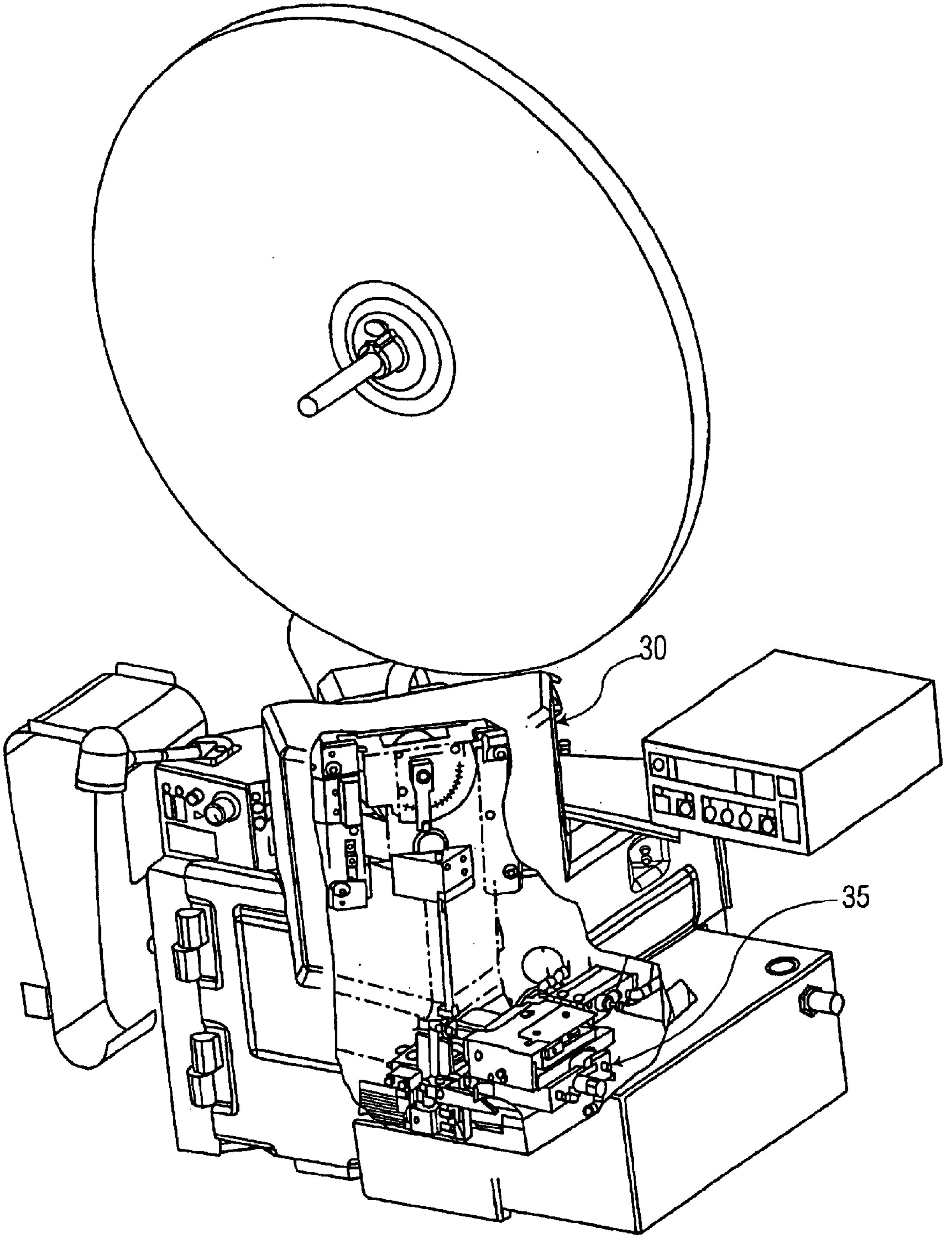
FIG. 2 shows a view of a preferred embodiment.
Figure 3:
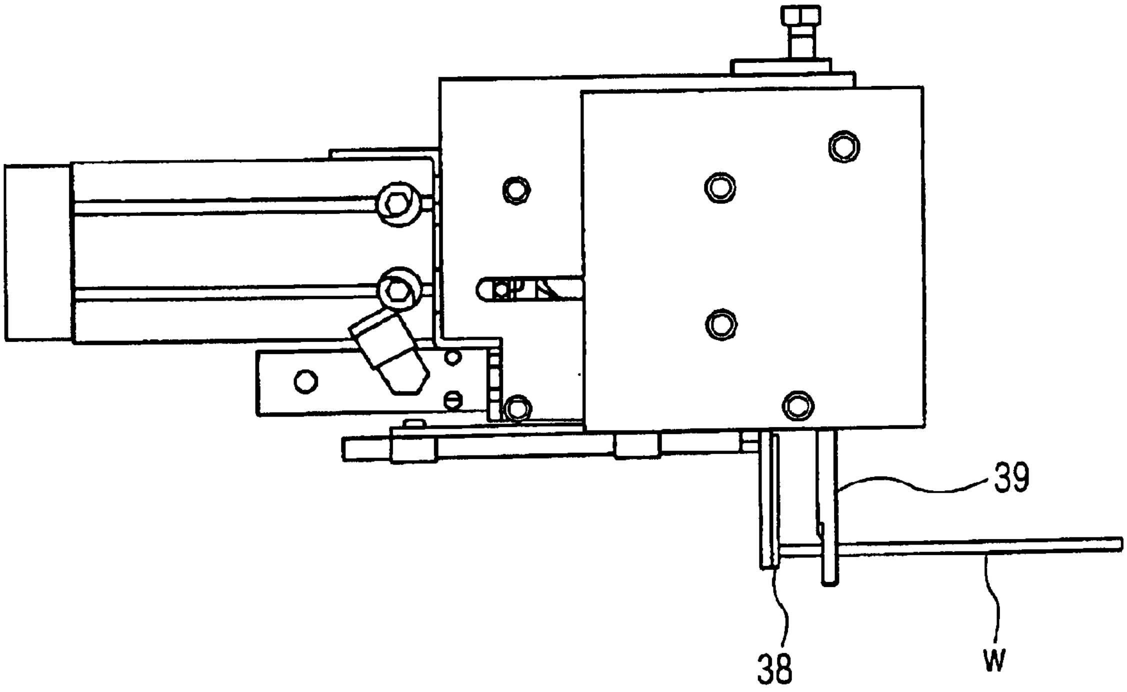
FIG. 3 shows a cutaway view of the embodiment of FIG. 1

FIG. 2 is a cutaway view of a preferred embodiment wire termination machine 30. An internal stripping module 35 is shown generally. FIG. 3 shows the stripping sub-assembly 35 in an enlarged view. Insulated wire w is loaded, automatically or manually in various embodiments, into the sub-assembly. The wire end deflects a start sensor plate 38 to begin the stripping cycle. Stripping blade 39 is comprised of an outer blade and inner blade, which, as the stripping cycle progresses, are driven by the subassembly to cut through the wire insulation, resulting in a stripped wire and insulation slug. The insulation slug is dispensed with in a manner not shown here and the wire may remain, be moved to the next station for crimping or, alternatively, may be ejected from the machine, other operations performed, etc. as desired.

Figure 4:
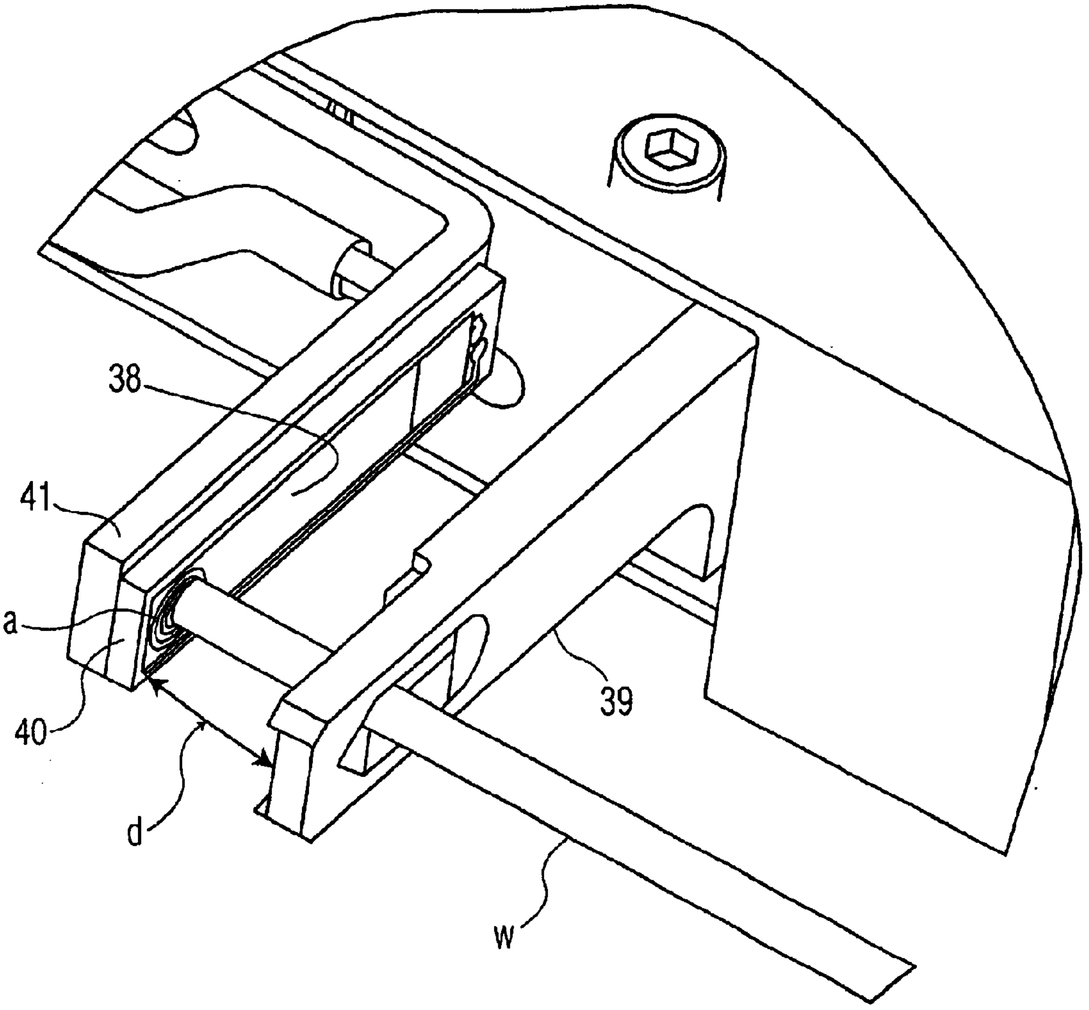
FIG. 4 shows another view of the embodiment of FIG. 1.

Turing to FIG. 4, a view of the start sensor plate 38 and stripping blade 39 is shown. Wire w has been loaded within the assembly. Distance d, between the start sensor plate 38 and stripping blade 39, is the strip distance, that is, it determines the length of insulation removed from the wire. Distance d can be adjusted as desired through manipulating arm 41, with attached members start sensor plate 38 and printed circuit board 40 toward or away from strip blade 39.

When wire w is loaded, it contacts area a on the start sensor plate 38. Area a provides a textured surface to increase frictional contact of the wire end. Thus wire w is retained more securely then would be the case with a smooth surface on the start sensor plate, and slippage of wire w off the sensor is minimized. By contact on start sensor plate 38, wire w pushes start sensor plate 38 to contact with printed circuit board 40, which closes the strip cycle circuit (not shown here) and begins a stripping cycle.

Figure 5:
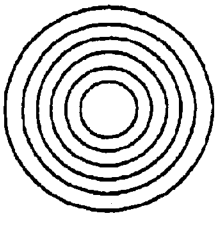
FIG. 5 shows another preferred embodiment.
Figure 6:
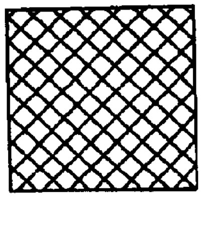
FIG. 6 shows another preferred embodiment.

FIGS. 5 and 6 show patterns used in the preferred embodiments to pattern or texture (the words are used interchangeably herein) a start sensor plate. The series of concentric circles seen in FIG. 5 provide a "grip" for various wire diameters, and so can be used in the especially preferred embodiments. The crosshatch pattern of FIG. 6 provides an alternate texture. The patterns of FIGS. 5 and 6 are created by laser. Other patterns could be used as well that are created by laser or other means, such as abrasion, rollers, tape, etc. It may be desired, for example, to use patterns matched to particular wire configurations.

It should be noted that the especially preferred embodiments use a texturing method, e.g., laser, that are unlikely to deform the start sensor plate. Deformation of the start sensor plate is not desirable because of plate must hinge or pivot once contacted by the wire end in order to contact the remainder of the sensor assembly and so begin a strip cycle. If the plate is deformed by a texturing method, appropriate contact may not be made, and so a strip cycle not begun.

It should also be noted that embodiments of the present invention may be used where similar deflection or contact methods, such as are known in the art, may be used to begin a strip cycle. Thus the exact shape of a start sensor plate is not important to the various embodiments of the present invention.

It should be noted that embodiments of the present invention may be used in any type of wire processing machine which uses a start sensor to indicate the presence of a wire at a desired location. Also, various embodiments allow for replacement or retrofitting of non-textured start sensor plates in processing machines. The non textured plate is removed and replaced with a textured plate in those embodiments.

Additionally, embodiments may comprise the application of a texture to an already existing sensor plate, for example, the application of tape or other substance to a non-textured plate so as to texture the existing sensor plate. Thus the existing plate is left in place yet it is now textured. In these embodiments, of course, it is desirable that any texturing done be done so that the texturing is unlikely to deform the start sensor plate. As was described above, deformation of the plate is undesirable.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. In a wire processing machine which uses a start sensor to indicate the presence of a wire at a desired location, which indication begins the processing of said wire, the improvement comprising: a textured surface for said start sensor so that when said start sensor is contacted by a wire to be processed, said wire at least partially contacts said textured surface for restricting movement of said wire.

2. An apparatus as in claim 1 wherein said textured surface is further comprised of concentric circles.

3. An apparatus as in claim 1 wherein said textured surface is further comprised of crosshatched lines.

4. An apparatus as in claim 1, wherein said textured surface provides frictional contact of the wire to inhibit slippage.

5. A wire processing machine comprising:

a start sensor for indicating the presence of a wire at a desired location, said start sensor comprising a textured surface that is contacted by a wire to be processed, wherein said wire contacts said textured surface to restrict movement of said wire.

6. The wire-processing machine of claim 5, wherein said textured surface is further comprised of concentric circles.

7. The wire-processing machine of claim 5, wherein said textured surface is further comprised of crosshatched lines.

8. The wire-processing machine of claim 5, wherein said textured surface provides frictional contact of the wire to inhibit slippage.

9. The wire-processing machine of claim 5, wherein said textured surface inhibits lateral movement of a tip of the wire as said wire deflects a contact plate.

10. The wire-processing machine of claim 5, wherein movement of said wire is restricted while the wire is processed.

11. A wire processing machine comprising:

a start sensor for indicating the presence of a wire at a desired location, said start sensor comprising a textured surface that is contacted by a wire to be processed, wherein said textured surface stabilizes the wire for processing by inhibiting lateral movement of a tip of the wire as said wire deflects a contact plate.

* * * * *